Figure 1:
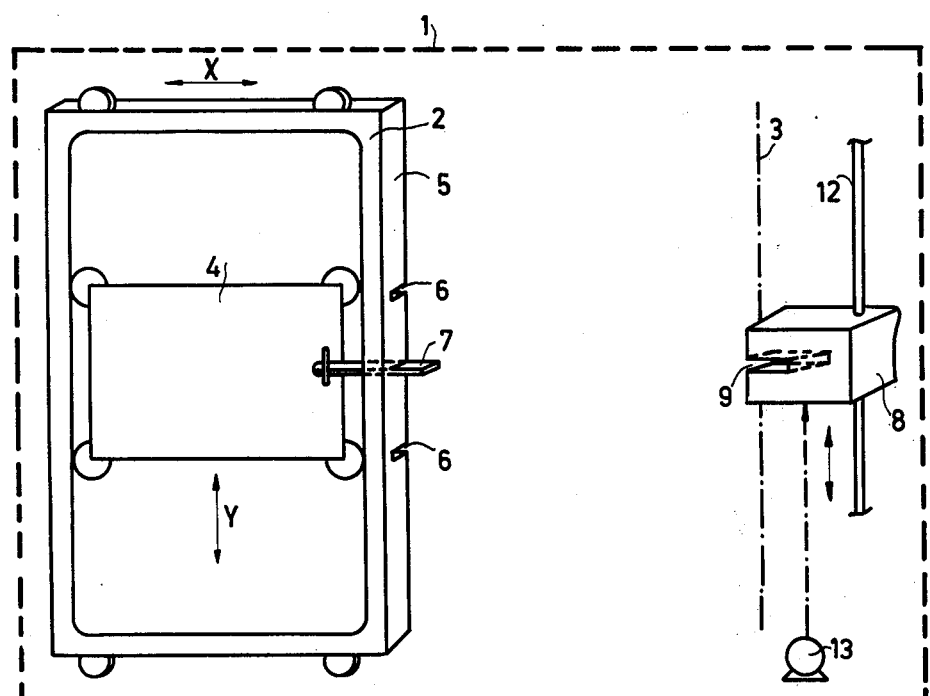

United States Patent [19]
Gieschen et al.

[11] 4,162,406
[45] Jul. 24, 1979

[54] X-RAY APPARATUS COMPRISING AN INTERMITTENTLY DISPLACEABLE FILM HOLDER

[75] Inventors: Kurt Gieschen; Walter Schmedemann, both of Hamburg, Fed. Rep. of Germany

[73] Assignee: U.S. Philips Corporation, New York, N.Y.

[21] Appl. No.: 823,106

[22] Filed: Aug. 9, 1977

[30] Foreign Application Priority Data

Aug. 11, 1976 [DE] Fed. Rep. of Germany ....... 2636078

[51] Int. Cl.$^2$ ............................................. G11B 1/00
[52] U.S. Cl. ..................................... 250/468; 250/471
[58] Field of Search ................................. 250/468, 471

[56] References Cited

U.S. PATENT DOCUMENTS

| | | | |
|---|---|---|---|
| 2,749,445 | 6/1956 | Stava | 250/471 |
| 3,069,544 | 12/1962 | Kizaur | 250/471 |
| 3,173,010 | 3/1965 | Barrett | 250/471 |

*Primary Examiner*—Craig E. Church
*Attorney, Agent, or Firm*—Thomas A. Briody; Edward J. Connors, Jr.; Jack E. Haken

[57] ABSTRACT

An X-ray apparatus comprising a film holder which is displaceable between a number of recording positions and a parking position and which can be locked in each of the recording positions by means of a latch cooperating in the parking position, with a catch which unlocks the latch and intermittently displaces the film holder to the next recording position.

7 Claims, 5 Drawing Figures

X-RAY APPARATUS COMPRISING AN INTERMITTENTLY DISPLACEABLE FILM HOLDER

The invention relates to an X-ray apparatus, comprising a frame which is displaceable in a framework between a number of recording positions and a parking position, and a film holder which is intermittently displaceable with respect to the frame and the relative displacement direction of which extends transversely of the displacement direction of the frame. The film holder being lockable in a number of recording positions with respect to the frame, the film holder being unlocked when the frame is moved from one of the recording positions to a parking position.

In a known X-ray apparatus of the described kind (German Patent Specification 968,538), the film holder can be locked in two positions with respect to the frame, so that the film format can be halved in the direction transversely of the displacement direction of the frame. Locking is effected by means of a locking pin which is slidable in the frame and which is operated by a lever which is pivotable on the frame. During the displacement of the frame, this lever co-operates with a pivotable arm which is mounted in the frame work.

The known X-ray apparatus has a drawback in that for the displacement of the film holder with respect to the frame use must be made of the force of gravity, so that the apparatus can be used only in the vertical position. Furthermore, the film format in the known apparatus cannot be divided by more than two in a direction transversely of the displacement direction of the frame. Using the known locking and displacement principle such a further division of the film format would lead to a complex construction comprising more than one locking pin and several of said levers and pivotable arms.

The invention has for its object to provide an X-ray apparatus in which the film format can be divided in an arbitrary number of steps in a simple manner, without the increased number of steps giving rise to an essentially more complex construction.

To this end, an X-ray apparatus in accordance with the invention is characterized in that the framework comprises a catch for the film holder which is intermittently displaceable and driven by a motor, said catch also serving for unlocking the film holder with respect to the frame and being arranged near a position which corresponds to the parking position of the frame.

The invention will be described in detail hereinafter with reference to the accompanying drawing.

FIG. 1 diagrammatically shows a preferred embodiment of an intermittently displaceable film holder in accordance with the invention.

Figure 2A:
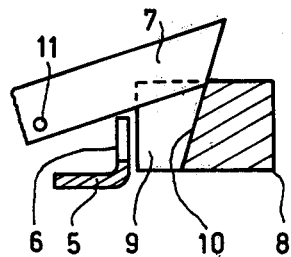
Figure 2B:
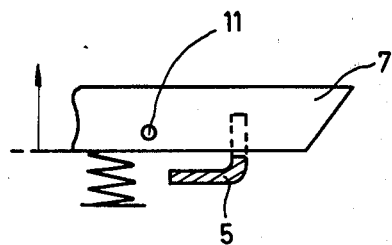
Figure 4:
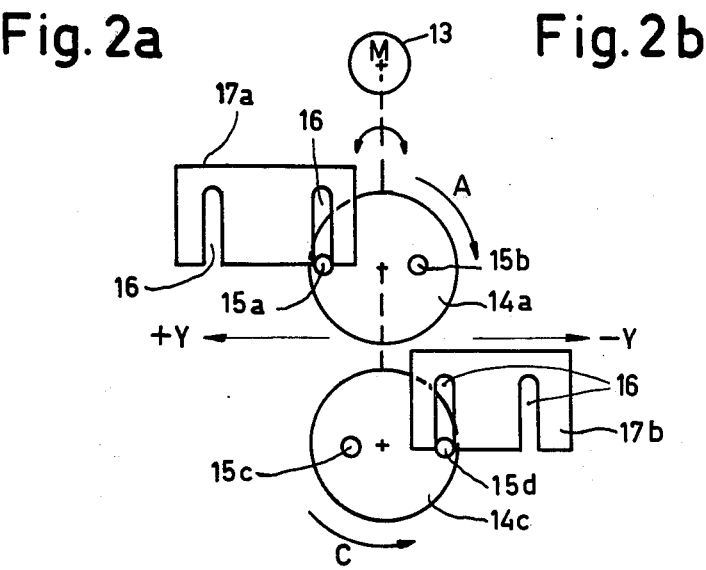
Figure 3:
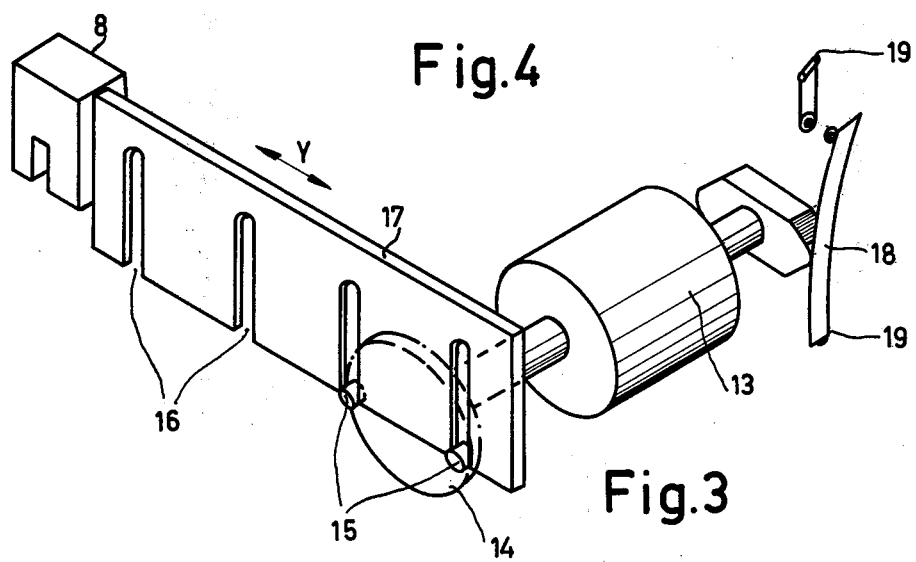

FIG. 2 shows a special embodiment of a lock as used in a film holder as shown in FIG. 1, FIG. 3 shows a special embodiment of a drive for the film holder shown in FIG. 1, FIG. 4 shows a further embodiment of a drive for the film holder shown in FIG. 1.

The framework 1 denoted only diagrammatically by a broken line in FIG. 1, forms part of an X-ray apparatus which may be of a customary type and which is not shown for the sake of simplicity. Inside the framework 1, a frame or carriage 2 is displaceable in a customary manner in the horizontal direction (see arrow x) by means of an electric motor (not shown). The frame 2 can be moved from a parking position (in which the right side of the frame occupies the position denoted by a stroke/dot line 3) to the left to one of the various recording positions.

Inside the frame 2, a film holder 4 is movable in the vertical direction (see arrow y). The film holder 4 may be provided with a film cassette, as well as a separate film.

The frame 2 is provided on its right side 5 with a number of lockings slots 6 which correspond to the recording positions. On the film holder 4 there is provided a pivotable latch 7 which is pulled into one of the lockings slots 6 by spring force when it is situated in exactly the same vertical position as the relevant slot 6. The latch 7 is rigidly coupled to the film holder 4 in the vertical position, so that the vertical position of the film holder 4 is determined by the vertical position of the latch 7. The film holder 4 can be locked within the frame 2 in defined positions which correspond to the recording positions required for the various vertical sub-divisions of the film format. In the device shown in FIG. 1, three recording positions are possible: a central position in which the film holder 4 is situated when the film format is not to be sub-divided, and an upper and a lower position in which the film holder 4 is situated when a film format is to be sub-divided. Accordingly, the position of and the distance between the slots 6 is chosen so that the film holder 4 occupies one of the possible recording positions in each locking position within the frame 2.

The latch 7 can also be secured to the frame 2. Obviously, the slots 6 are then provided in the film holder 4. Alternatively, the latch 7 can be provided with recesses which co-operate with pins in the frame 2 or the film holder 4. The film holder 4 is always locked with respect to the frame 2 when the frame 2 is not in the parking position 3. When the frame 2 is moved into the parking position, the latch 7 engages a catch 8 which is provided with a horizontal slot 9 for this purpose. The latch 7 slides into this catch slot 9 and abuts against an inclined abutment 10 which forms part of the catch slot 9 (see FIG. 2a). When the frame 2 is displaced further in the x-direction to the right, the latch 7 is pivoted outwards against spring force (see FIG. 2b) about a vertical shaft 11, and is thus released from the relevant slot 6, so that the film holder 4 is unlocked with respect to the frame 2. However, the latch 7 continues to engage the catch 8. The stroke which can be performed by the latch 7 is such that the latch remains in the slot 9 in the catch 8 after disengagement from one of the slots 6 in the frame 2 (see FIG. 2a).

When a vertical displacement of the film holder 4 with respect to the frame 2 is required for the next exposure, the film holder 4 can be displaced in the frame 2. To this end, the catch 8, vertically guided by a guide 12, is coupled to a drive which displaces the catch along the guide 12 in the vertical direction and which is represented by a motor 13 in FIG. 1. The film holder 4 is displaced in the frame 2 until it reaches the vertical position required for the next exposure, it being possible to lock the film holder 4 in said position again. Locking is effected, after deactivation of the vertical drive 13, in that the frame 2 is displaced to the left in the x-direction until the right side of the latch 7 and the abutment 10 (FIG. 2a) no longer contact each other, so that the latch 7 again engages a lockings slot 6 under the influence of the spring force acting thereon. When the latch 7 is subsequently completely removed from the catch slot 9 of the catch 8, the film holder 4 is retained in the vertical position again by co-operation of the latch 7 and the frame 2. FIG. 2b diagrammatically shows the latch 7 and the right side 5 of the frame 2 at this stage.

The catch remains in the last position reached until the frame 2 is returned to the parking position. Because the film holder 4, and hence the latch 7, have not meanwhile changed their vertical position, the latch 7 is taken up again by the catch 8, after which the film holder 4 can be moved in the vertical direction again, if desired.

It will be obvious that the vertical displacement must be effected as accurately as possible. This is because when the film holder does not exactly reach the correct position during vertical displacement in the parking position, the latch will not be locked in the slot in the frame associated with the position in given circumstances. On the other hand, the displacement in the vertical direction must also be effected as quickly as possible in order to minimize the delay between two exposures in the case of vertical sub-division of the film.

FIG. 3 shows a drive which allows such a fast and at the same time accurate displacement of the film holder in the vertical direction. The reference numeral 13 denotes the electric motor for the vertical displacement which drives a pulley 14 which is mounted on its drive shaft. On the pulley 14 there are provided two drive pins 15 which are arranged diagrammatically opposite each other at the same distance from the drive shaft. The drive pins 15 engage slots 16 provided in a strip 17. The slots 16 extend in a direction transversely of the movement direction (Y-direction) of the strip 17. The catch 8 is rigidly connected to the strip 17. The strip 17 is situated so that the side provided with slots coincides approximately with the drive shaft of the motor 13, so that only one drive pin 15 fully engages a slot 16.

When the motor 13 is switched so that the pulley 14 rotates clockwise, the right drive pin 15 is rotated out of the first slot 16, while the left drive pin 15 penetrates continuously further into the second slot 16, so that the strip 17 is displaced downwards (see FIGS. 1 and 3). After one half revolution of the pulley 14, the drive pins 15 have changed positions, but the strip 17 has been displaced downwards over the pitch distance of two slots by the left drive pin 15. When the pulley 14 is rotated further, the operation is repeated, be it that the originally right drive pin 15 performs the displacement of the strip 17 during the second half of the revolution. The overall displacement of the strip 17 during a complete revolution of the pulley 14 thus equals twice the pitch distance of the slots 16.

When the motor 13 rotates the pulley 14 at a constant speed, the velocity of the strip 17 (in the y-direction) equals zero each time after one half revolution. The variation of the velocity of the strip 17 is sinusoidal. The zero point of the velocity of the strip 17 is reached in the position of the drive pins 15 which is shown in FIG. 3 or in a similar position. When the motor is switched off in this position of the drive pins 15, any running out of the motor 13 does not cause unacceptable displacement of the strip 17 in the y-direction. Therefore, if it is ensured that the necessary vertical positions of the film holder 4 are obtained each time when the velocity of the strip 17 has reached the value zero, accurate positioning is also possible in the case of fast displacement of the film holder.

The pitch distance of the slots 16 or the distance between the two drive pins 15 should correspond accurately to the distance between the slots 16 (and hence to the distance between two adjacent recording positions of the film holder 4 in the frame 2) to a fraction 1/n of this distance, n being an integral number. In that case, the film holder is moved from a recording position to an adjacent recording position after each one half revolution or n half revolutions, so that the speed is zero when each of the various positions are reached. The more half revolutions to be performed by the motor drive between two adjacent recording positions, the smaller the torque to be delivered by the motor (use can be made of drives having a higher transmission ratio, then), however, the positional inaccuracy caused by the running out of the motor is then also greater. A favourable compromise between positional accuracy and torque or the transmission ratio is obtained when an adjacent recording position is reached after each two half revolutions (i.e. if the distance between the drive pins 15 or between the slots 16 corresponds to half the distance between two adjacent slots 6).

For switching off the motor 13 at the instant at which the velocity reaches the value zero, a contact 18 may be used which is always opened by an interrupter 19 arranged on the drive shaft of the motor 13 when the drive pins 15 reach the position shown in FIG. 3, i.e. when the velocity is zero. Alternatively, switching contacts may be used which are rigidly arranged in the frame work 1 and which co-operate with contacts arranged on the catch 8 or the strip 17 and corresponding to the various recording positions. The adverse effect of the running out of the motor can be avoided by switching off the motor a given time period before the zero value of the velocity of the strip is reached.

Because many X-ray apparatus utilize 18 cm film as well as 24 cm film, the film holder in these X-ray apparatus must be displaceable each time from a (vertical) central position in the upwards or downwards direction over approximately a distance equal to one quarter of the film length. In the case of a film which has a length of 18 cm in the y-direction, this distance thus amounts to approximately 45 mm and in the case of a film of 24 cm it amounts to approximately 60 mm.

To this end, a drive such as that shown in FIG. 3 should comprise drive pins 15 which are symmetrically arranged with respect to the drive shaft of the motor, at a distance of approximately 15 mm from each other, and the strip 17 should have at least eight horizontal slots 16 at equal distances from each other. Using each time three half revolutions, the film holder could then be displaced from a central position in the upward or downward direction to the position required for the sub-division of an 18 cm film. In the case of a 24 cm film, this vertical position, required for the sub-division, would be reached each time after four revolutions. In order to displace the film holder from the lower vertical position to the upper vertical position, however, eight half revolutions would be required.

FIG. 4 shows a drive which is based on the same principle as the drive shown in FIG. 3, but which necessitates less revolutions of the pulley 14 for the displacement. The drive shown in FIG. 4 is particularly suited in applications where the distances between the various vertical positions and the central vertical position do not have a common denominator (in the above example, the denominator was 15 mm). The electric motor 13 of the drive shown in FIG. 4 drives two pulleys 14a and 14c, the axis of rotation of which coincides with the drive shaft of the motor (shown to be staggered for the sake of simplicity). The pulley 14a comprises two drive pins 15a and 15b which are arranged diametrically opposite each other and which are located at a different distance from the centre of the pulley. The distance between the drive pin 15a and the centre of the pulley amounts to half the distance to be travelled by the film holder in order to each the (first) lower recording position from the central position (occupied by the film holder when the film format need not be sub-divided in the vertical direction). This distance amounts to 44 mm in the case of an 18 cm film, so that the distance between the drive pin 15a and the centre of the pulley is 22 mm. The distance between the second drive pin 15b and the first drive pin 15a is half the distance to be travelled by the film holder from its central position in order to reach the second (lower) recording position. In the case of a 24 cm film, this distance is approximately 57 mm, so that the distance between the two drive pins 15a and 15b should is 28½ mm. The pulley 14c also has two drive pins 15c and 15d. The pins 15c and 15d are arranged to be rotated through an angle of 180° with respect to the drive pins 15a and 15b. The drive pins 15a, 15b and 15c and 15d, arranged on the pulleys 14a and 14b, respectively, co-operate with parts 17a and 17b, respectively, of the strip 17. The strip parts 17a and 17b are shown to be staggered with respect to each other for the sake of clarity, but they actually form part of one and the same strip 17. The strip parts 17a and 17b are provided with slots 16, whose pitch distance again corresponds to the distance between the drive pins 15a, 15b and 15c, 15d, respectively. In the central position of the film holder, the strip parts 17a and 17b occupy the positions shown in FIG. 4. The drive pins 15a and 15b which are further removed from the centre of the pulleys 14a and 14c then engage the first slots 16 of the strip parts 17a and 17b, respectively, while the drive pins 15b and 15c are not in engagement with the strip parts 17a and 17b.

When the pulleys 14a and 14c are driven in the direction of the arrow C, the drive pin 15d is forced deeper into the slot of the strip part 17b and the entire strip 17 is moved upwards. The drive pins 15a, 15b and 15c are not in engagement with the relevant strip parts. After one half revolution of the pulley 14c in the direction of the arrow C, the strip parts 17b and 17a have travelled upwards twice the distance (2×22 mm=44 mm) between the drive pins 15d and the centre of the pulley 14c, and the velocity of the strip 17 again equals zero. The film holder can be accurately locked in the frame in this position. At the end of the second half revolution, the drive pin 15c is situated in front of the second slot in the strip part 17b and effects the further transport of the strip 17. As a result of the next half revolution of the pulley 14c, the strip parts 17b and 17a are again displaced over twice the distance (2×6½ mm=13 mm) between the drive pin 15c and the centre of the pulley 14c, so that the strip 17 has been displaced upwards from its central position over a total distance of 57 mm after the second half revolution.

When the pulleys 14a and 14c are rotated in the direction of the arrow A by the motor drive, the strip 17 is displaced downwards. Displacement is then effected by the drive pins 15a and 15b which engage the slots 16 of the strip part 17a and displace it downwards.

What is claimed is:

1. An X-ray apparatus comprising a support frame, a carriage mounted in said support frame for displacement along a first direction between at least a first position and a parking position, a film holder mounted in said carriage for displacement relative to said carriage in a second direction transverse to said first direction, means for releasably locking said film holder with respect to said carriage in one of a plurality of recording positions spaced along a line extending in a direction generally parallel to said second direction, catch means arranged adjacent said parking position for displacement in a direction parallel to said second direction between a second plurality of spaced positions corresponding to said plurality of recording positions, said catch means being arranged to engage said locking means, release said film holder from said carriage and releasably secure said film holder to said catch means for displacement therewith upon displacement of said carriage into said parking position, and means for displacing said catch means between said positions of said second plurality to thereby displace said film holder secured thereto between said recording positions.

2. The apparatus according to claim 1 wherein said locking means includes a plurality of locking slots each corresponding to one of said recording positions formed in said carriage; a latch pivotably mounted in said film holder and arranged to engage one of said locking slots to thereby lock said film holder to said carriage; and means for resiliently maintaining said latch in engagement with said locking slot.

3. The apparatus according to claim 2 wherein said catch means includes an abutment arranged to engage and release said latch from said locking slot upon movement of said carriage into said parking position.

4. The apparatus according to claim 3 wherein said catch means has a catch slot adapted to receive said latch upon movement of said carriage into said parking position, said abutment forming one wall portion of said catch slot, said catch slot having a second wall portion adapted to releasably secure said latch to said catch means upon release of said latch from said locking slot.

5. The apparatus according to claim 1 wherein said displacing means is arranged to displace said catch means with a velocity which varies sinusoidally as a function of the position of said catch means along the direction of displacement such that the velocity is zero when said catch means is at said positions of said second plurality.

6. An X-ray apparatus comprising a support frame, a carriage mounted in said support frame for displacement along a first direction between at least a first position and a parking position, a film holder mounted in said carriage for displacement relative to said carriage in a second direction transverse to said first direction, means for releasably locking said film holder with respect to said carriage in one of plurality of spaced recording positions, catch means arranged adjacent said parking position for displacement between a second plurality of spaced positions corresponding to said plurality of recording positions, said catch means being arranged to engage said locking means, release said film holder from said carriage and releasably secure said film holder to said catch means for displacement therewith upon displacement of said carriage into said parking position, and means for displacing said catch means and said film holder secured thereto between said positions of said second plurality, said displacing means including a motor having a rotatable shaft, at least two pulleys each secured to said shaft and each having two drive pins arranged on a line passing through and being spaced at different distances from the center of the respective pulley, and an elongated, displaceable member secured to said catch means, said elongated member having a plurality of slots extending in a direction transverse to the direction of displacement of said elongated member, said slots being spaced from each other a distance equal to the distance between two drive pins on one of said pulleys and being arranged to engage said drive pins to thereby displace said elongated member and said catch means secured thereon upon rotation of said shaft.

7. An X-ray apparatus comprising a support frame, a carriage mounted in said support frame for displacement along a first direction between at least a first position and a parking position, a film holder mounted in said carriage for displacement relative to said carriage in a second direction transverse to said first direction, means for releasably locking said film holder with respect to said carriage in one of plurality of spaced recording positions, catch means arranged adjacent said parking position for displacement between a second plurality of spaced positions corresponding to said plurality of recording positions, said catch means being arranged to engage said locking means, release said film holder from said carriage and releasably secure said film holder to said catch means for displacement therewith upon displacement of said carriage into said parking position, and means for displacing said catch means and said film holder secured thereto between said positions of said second plurality, said displacing means including a motor having a rotatable shaft, a pulley secured to said shaft and having two drive pins arranged diametrically opposite each other and spaced equal distances from said shaft, and an elongated, displaceable member secured to said catch means, said elongated member having a plurality of slots extending in a direction transverse to the direction of displacement of said elongated member, said slots being spaced from each other a distance equal to the distance between said drive pins and being arranged to engage said drive pins to thereby displace said elongated member and said catch means secured thereto upon rotation of said shaft.

* * * * *